(12) United States Patent
Luedecke et al.

(10) Patent No.: US 11,033,073 B2
(45) Date of Patent: Jun. 15, 2021

(54) EMBROIDERED FOAMING CORDS FOR MIDSOLES

(71) Applicant: Under Armour, Inc., Baltimore, MD (US)

(72) Inventors: Tom Luedecke, Portland, OR (US); Jiamin Zhu, Guangzhou (CN)

(73) Assignee: Under Armour, Inc., Baltimore, MD (US)

( * ) Notice: Subject to any disclaimer, the term of this patent is extended or adjusted under 35 U.S.C. 154(b) by 248 days.

(21) Appl. No.: 15/648,625

(22) Filed: Jul. 13, 2017

(65) Prior Publication Data
US 2019/0014859 A1 Jan. 17, 2019

(51) Int. Cl.
| | |
|---|---|
| *A43B 13/04* | (2006.01) |
| *A43B 13/18* | (2006.01) |
| *D05C 17/00* | (2006.01) |
| *A43B 13/12* | (2006.01) |
| *B29D 35/00* | (2010.01) |
| *D05C 7/08* | (2006.01) |

(52) U.S. Cl.
CPC ............ *A43B 13/188* (2013.01); *A43B 13/04* (2013.01); *A43B 13/125* (2013.01); *A43B 13/186* (2013.01); *B29D 35/0063* (2013.01); *D05C 17/00* (2013.01); *D05C 7/08* (2013.01); *D10B 2501/043* (2013.01)

(58) Field of Classification Search
CPC ... A43B 13/188; A43B 13/125; A43B 13/186; A43B 13/04; B29D 35/0063; D05C 17/00; D05C 7/08; D10B 2501/043
See application file for complete search history.

(56) References Cited

U.S. PATENT DOCUMENTS

| | | | | |
|---|---|---|---|---|
| 1,923,169 A | * | 8/1933 | Simmons | A43B 13/383 36/44 |
| 2,100,492 A | * | 11/1937 | Sindler | A43B 13/20 12/146 BR |
| 2,412,808 A | * | 12/1946 | Goldstein | A43B 1/04 36/11.5 |
| 2,467,821 A | * | 4/1949 | Jon | A43B 1/04 12/146 B |
| 3,059,251 A | * | 10/1962 | Pollock | A47C 27/122 264/172.15 |

(Continued)

FOREIGN PATENT DOCUMENTS

| | | |
|---|---|---|
| DE | 1806965 A1 | 7/1970 |
| EP | 504072 | 11/1995 |
| JP | 2006142000 A | 6/2006 |

*Primary Examiner* — Katharine G Kane
(74) *Attorney, Agent, or Firm* — Plumsea Law Group, LLC

(57) ABSTRACT

In one embodiment, a midsole for an article of footwear is described that includes a first foaming cord made of a first material and a second foaming cord made of a second material. The first material is different than the second material. The first foaming cord and the second foaming cord are embroidered into a shape of the midsole. The first foaming cord and the second foaming cord may be embroidered to a substrate material by thread. A midsole can include multiple layers of foaming cords. Customized midsoles may be formed by selective placement of one or more foaming cords in different locations or layers to provide different properties or characteristics to the midsole.

17 Claims, 16 Drawing Sheets

(56) References Cited

U.S. PATENT DOCUMENTS

| | | | | |
|---|---|---|---|---|
| 3,251,728 | A * | 5/1966 | Humbert | B65D 81/09 206/523 |
| 4,243,713 | A | 1/1981 | Worrall et al. | |
| 4,272,898 | A * | 6/1981 | Tansill | A43B 7/28 206/219 |
| 4,952,450 | A * | 8/1990 | Noel | B29C 44/468 428/174 |
| 5,203,269 | A * | 4/1993 | Glenn | D05B 35/06 112/147 |
| 5,399,410 | A * | 3/1995 | Urase | D05C 1/08 112/439 |
| 5,609,119 | A * | 3/1997 | Yeh | D05C 17/00 112/103 |
| 5,832,854 | A * | 11/1998 | Lin | D05C 17/00 112/475.22 |
| 5,916,006 | A * | 6/1999 | Ganson | A63H 33/00 446/107 |
| 5,947,044 | A * | 9/1999 | Lin | D05C 17/00 112/439 |
| 6,061,928 | A * | 5/2000 | Nichols | A43B 13/181 36/28 |
| 7,926,204 | B2 * | 4/2011 | Ungari | B29D 35/122 36/25 R |
| 7,926,519 | B1 * | 4/2011 | Wigent, III | D03D 1/0088 139/437 |
| 8,209,883 | B2 | 7/2012 | Lyden | |
| 8,601,720 | B2 * | 12/2013 | Aveni | A41D 19/01547 36/11.5 |
| 9,296,024 | B2 | 3/2016 | Sweeney | |
| 2002/0035796 | A1 * | 3/2002 | Knoche | A43B 1/0009 36/59 R |
| 2004/0197529 | A1 * | 10/2004 | Cadamuro | A43B 13/186 428/174 |
| 2004/0226497 | A1 * | 11/2004 | Lin | D05C 17/00 112/475.22 |
| 2004/0231577 | A1 * | 11/2004 | Wang | D05C 17/00 112/475.19 |
| 2005/0087114 | A1 * | 4/2005 | Cho | D05C 17/00 112/475.22 |
| 2008/0178786 | A1 * | 7/2008 | Butcher | A61F 2/0063 112/439 |
| 2009/0094858 | A1 * | 4/2009 | Ungari | B29D 35/122 36/88 |
| 2010/0112275 | A1 * | 5/2010 | Hansen | B32B 5/26 428/107 |
| 2011/0277349 | A1 * | 11/2011 | Kim | A43B 3/0005 36/84 |
| 2011/0283560 | A1 * | 11/2011 | Portzline | A43B 13/04 36/31 |
| 2012/0260838 | A1 * | 10/2012 | Matsuhiro | D05B 35/06 112/475.18 |
| 2013/0081307 | A1 | 4/2013 | del Biondi et al. | |
| 2013/0291409 | A1 * | 11/2013 | Reinhardt | A43B 13/04 36/30 R |
| 2014/0020192 | A1 * | 1/2014 | Jones | A43B 13/14 12/146 B |
| 2014/0050899 | A1 * | 2/2014 | Kukoff | B32B 38/10 428/195.1 |
| 2014/0182170 | A1 * | 7/2014 | Wawrousek | A43B 13/223 36/103 |
| 2016/0278481 | A1 * | 9/2016 | Le | A43B 13/188 |
| 2016/0286898 | A1 | 10/2016 | Manz et al. | |

* cited by examiner

EMBROIDERED FOAMING CORDS FOR MIDSOLES

BACKGROUND

Embroidery is a traditional method of decorating, tailoring, mending, patching, or reinforcing textile materials by sewing with a needle and stitching material. Hand embroidered goods date back as late as the Warring States period in China. During the industrial revolution, the invention of the sewing machine and dedicated embroidery machines expanded the use of the technique. Modern embroidery techniques may utilize machine readable code to autonomously create an embroidery pattern on a sheet of textile materials. Textile materials include fabrics such as cotton, wool or silk, as well as leather, foam, polymer sheets, and synthetic equivalents. On the textile materials, a number of stitch techniques may be used depending on the purpose of the embroidery, such as the chain stitch, the buttonhole or blanket stitch, the running stitch, the satin stitch, or the cross stitch. The stitching techniques may be used in combination to form a variety of set patterns. The stitching patterns may be decorative, for example the pattern may form a flower or series of flowers. Alternatively the stitching may be structural, such as stitching along the edges of a garment to reinforce the seams. In further cases the stitching may be both decorative and functional, such as the use of a floral pattern use to reinforce a patch.

Typically a thread or yarn is used as the stitching material and stitched into the textile. Commonly the thread or yarn may be made of cotton or rayon, as well as traditional materials like wool, linen or silk. However, embroidery may also sew in dissimilar materials to the textile, usually for decorative purposes. For example, thread created out of precious metals such as gold or silver may be embroidered within more traditional fabrics such as silk. Additional elements may be sewn in during embroidery, such as beads, quills, sequins, pearls or entire strips of metal. These elements may be sewn in along with yarn or thread using variety of stitching techniques depending on the desired placements of the elements.

SUMMARY

In one aspect, the invention comprises an article of footwear including an upper and a sole assembly. The sole assembly can include a midsole comprising at least a first foaming cord made of a first material and a second foaming cord made of a second material. The first material is different than the second material. The first foaming cord and the second foaming cord are embroidered into a shape of the midsole.

In another aspect, the invention comprises a midsole for an article of footwear. The midsole includes a first foaming cord made of a first material and a second foaming cord made of a second material different from the first material. The first foaming cord and the second foaming cord are embroidered to a substrate material by thread.

In another aspect, the invention comprises a method of forming a midsole for an article of footwear. The method includes embroidering a first foaming cord to a substrate material with a thread. The method also includes embroidering a second foaming cord to the substrate material with the thread. The first foaming cord and the second foaming cord are made of different materials.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
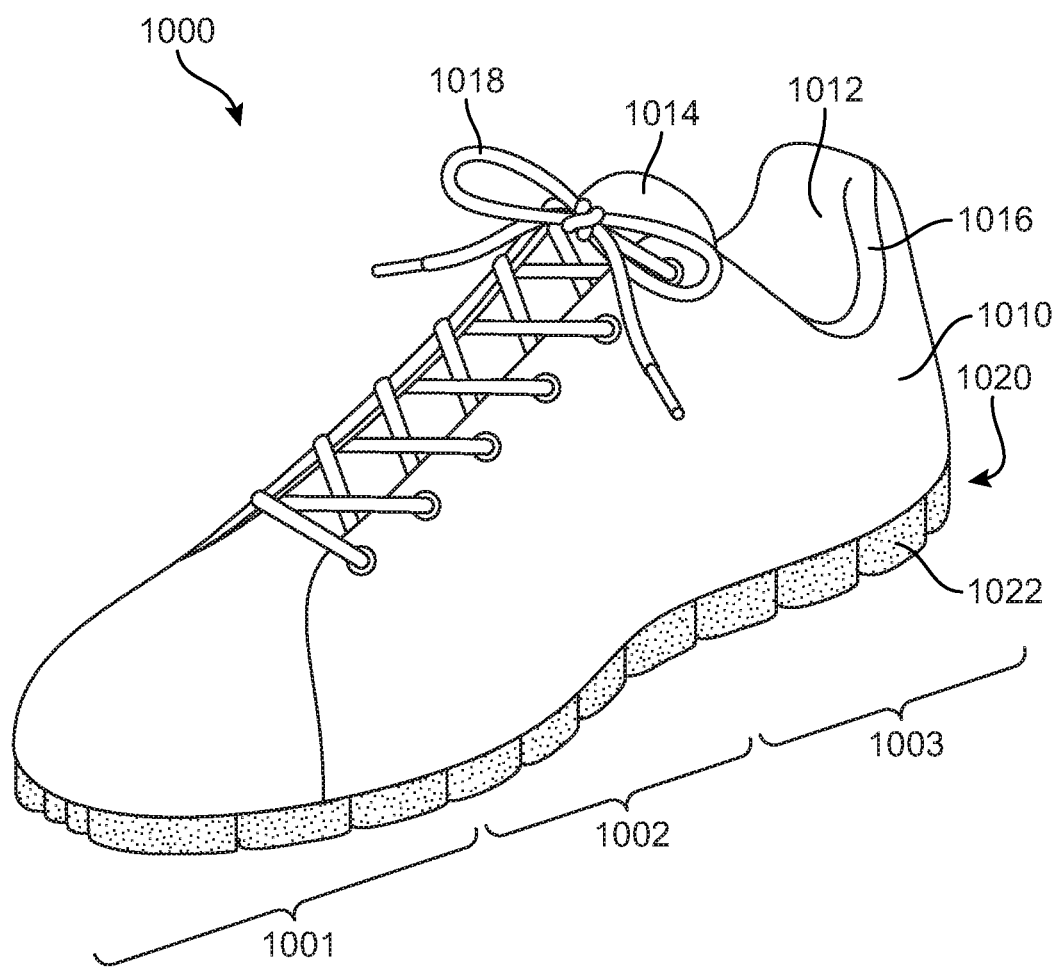
FIG. 1 is a schematic isometric view of an embodiment of an article of footwear.
Figure 2:
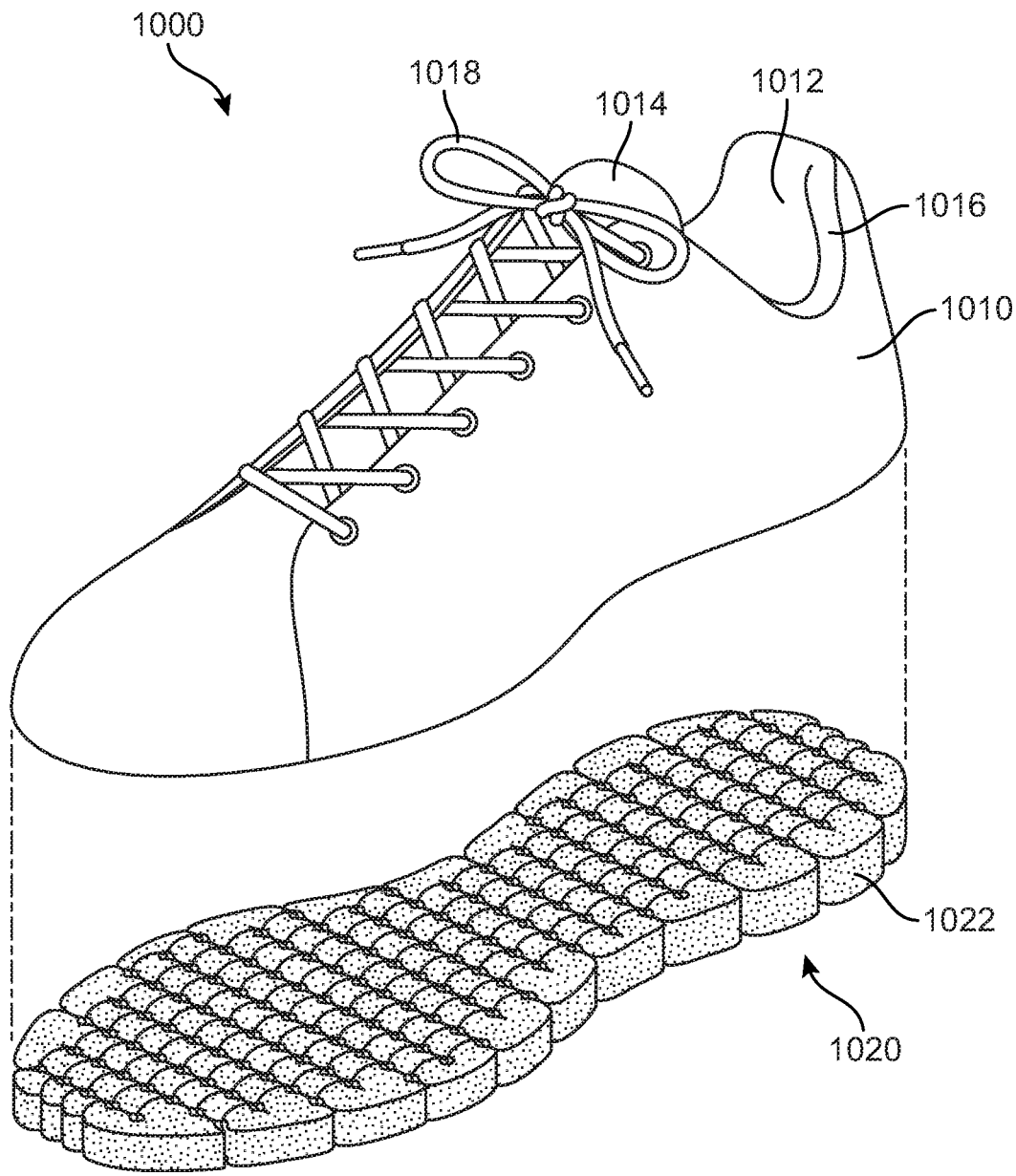
FIG. 2 is an exploded isometric view of an embodiment of an article of footwear including an embroidered foaming cord midsole.

In the following detailed description, reference is made to the accompanying figures which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structure, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure are synonymous.

The embodiments shown in FIGS. 1-16 are related to forming midsoles using embroidered foaming cords for an article of footwear. Articles of footwear include, but are not limited to: hiking boots, soccer shoes, football shoes, sneakers, running shoes, cross-training shoes, rugby shoes, basketball shoes, baseball shoes as well as other kinds of shoes. Moreover, in some embodiments, components may be configured for various kinds of non-sports related footwear, including, but not limited to: slippers, sandals, high heeled footwear, loafers as well as any other kinds of footwear.

In the illustrated embodiments of FIGS. 1-16, examples of midsoles formed using embroidered foaming cords are shown. In other embodiments, the principles and methods disclosed herein with regard to the illustrated embodiments may be used to form any one or more components of a sole assembly, including, but not limited to a sockliner, insole, midsole, outsole, and/or portions thereof.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

For purposes of general reference, as illustrated in FIG. 1 an article of footwear 1000 may be divided into three regions: a forefoot region 1001, a midfoot region 1002, and a heel region 1003. The forefoot region 1001 may be generally associated with the toes and joints connecting the metatarsals with the phalanges. The midfoot region 1002 may be generally associated with the arch of a foot, including the instep. Likewise, the heel region 1003 or "hindfoot" may be generally associated with the heel of a foot, including the calcaneus bone. For purposes of this disclosure, the following directional terms, when used in reference to an article of footwear, shall refer to the article of footwear when sitting in an upright position, with the sole facing the ground, that is, as it would be positioned when worn by a wearer standing on a substantially level surface.

The term "longitudinal," as used throughout this detailed description and in the claims, refers to a direction extending along the length of a component. For example, a longitudinal direction of an article of footwear extends from a forefoot region 1001 to a heel region 1003 of the article of footwear 1000. The term "forward" or "front" is used to refer to the general direction in which the toes of a foot point, and the term "rearward" or "back" is used to refer to the opposite direction, i.e., the direction in which the heel of the foot is facing.

The term "lateral direction," as used throughout this detailed description and in the claims, refers to a side-to-side direction extending along the width of a component. In other words, the lateral direction may extend between a medial side and a lateral side of article of footwear 1000, with the lateral side of article of footwear 1000 being the surface that faces away from the other foot, and the medial side being the surface that faces toward the other foot.

The term "vertical," as used throughout this detailed description and in the claims, refers to a direction generally perpendicular to both the lateral and longitudinal directions. For example, in cases where an article of footwear is planted flat on a ground surface, the vertical direction may extend from the ground surface upward. It will be understood that each of these directional adjectives may be applied to individual components of an article of footwear. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The term "side," as used in this specification and in the claims, refers to any portion of a component facing generally in a lateral, medial, forward, or rearward direction, as opposed to an upward or downward direction. The term "lateral side" refers to any component facing in general toward the lateral direction. The term "medial side" refers to any component facing in general towards the medial direction.

It will be understood that the forefoot region, the midfoot region, and the heel region are only intended for purposes of description and are not intended to demarcate precise regions of an article of footwear. For example, in some cases, one or more of the regions may overlap. Likewise, the medial side and the lateral side are intended to represent generally two sides, rather than precisely demarcating an article of footwear into two halves. In addition, the forefoot region, the midfoot region, and the heel region, as well as the medial side and the lateral side, may also be applied to individual components of an article of footwear, including a sole assembly, an upper, a lacing system, and/or any other component associated with the article.

An article of footwear 1000 may include an upper 1010 and a sole or "sole assembly" 1020 which define an internal cavity between the upper and sole. The "interior" of an article of footwear refers to space in this internal cavity that is occupied by a wearer's foot when the article of footwear is worn. The "inner side" or "inside" of an element refers to the face of that element that is (or will be) oriented toward the internal cavity in a completed article of footwear. The "outer side", "outside", or "exterior" of an element refers to the face of that element that is (or will be) oriented away from the internal cavity in the completed article of footwear 1000. In some cases, the inner side of an element may have other elements between that inner side and the interior in the completed article of footwear 1000. Similarly, an outer side of an element may have other elements between that outer side and the space external to the completed article of footwear 1000. Further, the terms "inward" and "inwardly" shall refer to the direction toward the interior of the article of footwear, and the terms "outward" and "outwardly" shall refer to the direction toward the exterior of article of footwear 1000.

The upper 1010 provides a covering for the wearer's foot that comfortably receives and securely positions the foot with respect to the sole assembly. Upper 1010 may be made from any suitable material or pluralities of materials, including but not limited to, for example, nylon, cotton, natural leather, synthetic leather, natural rubber, or synthetic rubber. In general, upper 1010 includes an opening 1012 that provides entry for the foot into an interior cavity of the upper in heel region 1003. Upper 1010 may be of a variety of styles depending on factors such as desired use and required ankle mobility. For example, an athletic shoe with upper 1010 having a "low-top" configuration extending below the ankle that is shaped to provide high mobility for an ankle. However, upper 1010 could be configured as a "high-top" upper extending above the wearer's ankle for basketball or other activities, or as a "mid-top" configuration extending to about the wearer's ankle. Furthermore, upper 1010 may also include non-athletic shoes, such as dress shoes, loafers, sandals, and work boots. Upper 1010 may also include a tongue 1014 that provides cushioning and support across the instep of the foot. Upper 1010 may also include a collar 1016 within cavity opening 1012. Upper 1010 may also include other known features in the art including a heel counter, heel tabs, loops, a toe cage, etc. Even further, upper 1010 may include logos, trademarks, and/or instructions for care. The upper 1010, and the components for upper 1010 may be manufactured from conventional materials (e.g., woven or nonwoven textiles, leather, synthetic leather, rubber, polymer foams, etc.). The specific materials used are generally selected to impart wear-resistance, flexibility, air-permeability, moisture control, and comfort to the article of footwear.

The upper 1010 may include a fastening provision on a fastening region of the upper. For example, fastening provision may be a lacing system 1018, or "lace" applied at a fastening region of upper 1010. Other embodiments of fastening provisions, include, but are not limited to, laces, cables, straps, buttons, zippers as well as any other provisions known in the art for fastening articles. For a lacing system, the fastening region comprises plurality of eyelets on upper 1010 comprised of a series of individual eyelets on each of the medial side and the lateral side of upper 1010 extending up to collar 1016 for receiving lace 1018. In other embodiments, the fastening region may comprise one or more tabs, loops, hooks, D-rings, hollows, or any other provisions known in the art for fastening regions.

The sole assembly 1020 is positioned between a foot of a wearer and the ground, and may incorporate various component elements. For example, sole assembly 1020 may include one or more of inner sole component or "insoles", a middle sole element or "midsole" 1022, and an outer sole element or "outsole". Insoles may also take the form of a sockliner adjacent the wearer's foot to provide a comfortable contact surface for the wearer's foot. It will be understood that an insole may be optional. Further, in some embodiments, midsole 1022 may directly serve as a cushion and support for the foot. In addition, an outsole may be configured to contact the ground surface. One or more of an insole, midsole 1022, and an outsole may be assembled together as sole assembly 1020, with the insole forming the interior of sole assembly 1020, and the outsole forming the exterior. The insole, midsole 1022, and an outsole may be combined into a single structure. The upper 1010 and sole assembly 1020 may be coupled using any conventional or suitable manner, such as adhesion or bonding, via a woven connection, via one or more types of fasteners, etc. Additionally, upper 1010 and sole assembly 1020 may be combined together in a single unitary construction.

The sole assembly 1020 may contact a ground surface and have various features to deal with the ground surface. Examples of ground surfaces include, but are not limited to, indoor ground surfaces such as wood and concrete floors, pavement, natural turf, synthetic turf, dirt, as well as other surfaces. In some cases, the lower portions of sole assembly 1020 may include provisions for traction, including, but not limited to, traction elements, studs, and/or cleats. In some cases, an outsole is secured to a lower surface of midsole 1022. It will be understood that in other embodiments, a separate outsole may be optional. For example, midsole 1022 may be configured to contact the ground surface directly. Furthermore, midsole 1022 could be provided with various traction elements, studs, and/or cleats to contact the ground surface. Additionally, portions of both midsole 1022 and an outsole can be configured to contact a ground surface.

The sole assembly 1020 may be made of a variety of any suitable material or pluralities of materials for a variety of functions. For example, one or more components of sole assembly 1020, such as midsole 1022, may be formed from a polymer foam (e.g., a polyurethane or ethylvinylacetate foam) material that attenuates ground reaction forces (i.e., provides cushioning) during walking, running, and other ambulatory activities. In addition, the components of a sole may also include gels, fluid-filled chambers, plates, moderators, inserts, or other elements that further attenuate forces, enhance stability, or influence the motions of the foot. In addition, the other components may have specific surface properties, such as an outsole being made from a durable material, such as carbon or blown rubber, which is further textured to impart traction. Furthermore the insole maybe made from a water proof material such as a synthetic such as ethylvinylacetate to prevent moisture seeping into the sole.

Dissimilar materials described herein may be attached by fusing or welding. As utilized herein, the terms "fusing" and "welding" (and variants thereof) are defined as a securing technique between two elements that involves a softening or melting of the material of at least one of the elements such that the materials of the elements are secured to each other when cooled. Similarly, the term "weld" or variants thereof is defined as the bond, link, or structure that joins two elements through a process that involves a softening or melting of material within at least one of the elements such that the elements are secured to each other when cooled. Welding may involve the melting or softening of two components such that the materials from each component intermingle with each other, that is, the materials may diffuse across a boundary layer (or "heat affected zone") between the materials, and are secured together when cooled. Alternatively, welding may involve the melting or softening of a material in a first component such that the material extends into or infiltrates the structure of a second component, for example, infiltrating crevices or cavities in the second component or extending around or bonding with filaments or fibers in the second component to secure the components together when cooled. Thus, welding of two components together may occur when material from one or both of the components melts or softens. Accordingly, a weldable material, such as a polymer material, may be provided in one or both of the components. Additionally, welding does not generally involve the use of stitching or adhesives, but involves directly bonding components to each other with heat. In some situations, however, stitching or adhesives may be utilized to supplement the weld or the joining of the components through welding. Components that have been welded together will be understood to be "fused" together.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" shall refer to the joining of two components in a manner such that the two components are secured together, but may be readily detached from one another. Examples of removable attachment mechanisms may include hook and loop fasteners, friction fit connections, interference fit connections, threaded connectors, cam-locking connectors, and other such readily detachable connectors. Similarly, "removably disposed" shall refer to the assembly of two components in a non-permanent fashion.

In the exemplary embodiments, a midsole is formed using embroidered foaming cords that are embroidered or stitched in place with a thread. Threads used for embroidery may be used from a variety of materials. For example, thread may be made of polymer materials including nylon, polyethylene, TPU, PVA, or EVA as well as Dyneema fiber made from Ultra-High Molecular Weight Polyethylene. Thread may also include a blend of polymers materials and may include nitrile rubber. Thread may be also made from more conventional materials including cotton, silk, or other natural fibers disclosed herein. Thread may also be made from any known synthetic equivalent. In some embodiments, exposing the thread to heat or pressure may cause the thread to melt or fuse. In other embodiments, exposing the thread to heat or pressure may cause the thread to dissolve. In still other embodiments, the thread may dissolve when exposed to a solvent, such as acid or water.

The term "strand" includes a single fiber, filament, or monofilament, as well as an ordered assemblage of textile fibers having a high ratio of length to diameter and normally used as a unit (e.g., slivers, roving, single yarns, plies yarns, cords, braids, ropes, etc.).

The term "fiber" as used herein refers to a fundamental component used in the assembly of yarns and fabrics. Generally, a fiber is a component which has a length dimension which is much greater than its diameter or width. This term includes ribbon, strip, staple, and other forms of chopped, cut or discontinuous fiber and the like having a regular or irregular cross section. "Fiber" also includes a plurality of any one of the above or a combination of the above. Examples of materials that may be utilized include cotton, polyester, nylon, polypropylene, polyethylene, acrylics, wool, acetate, polyacrylonitrile, and combinations thereof. Natural fibers also include cellulosic fibers (e.g., cotton, bamboo) or protein fibers (e.g., wool, silk, and soybean).

The term "filament" as used herein refers to a fiber of indefinite or extreme length such as found naturally in silk. This term also refers to manufactured fibers produced by, among other things, extrusion processes. Individual filaments making up a fiber may have any one of a variety of cross sections to include round, serrated or crenular, bean-shaped or others.

The term "yarn" as used herein refers to a continuous strand of textile fibers, filaments or material in a form suitable for weaving, or otherwise intertwining to form a textile fabric. Yarn can occur in a variety of forms to include a spun yarn containing staple fibers usually bound together by twist; a multi filament yarn containing many continuous filaments or strands; or a mono filament yarn which consists of a single strand.

The term "composite yarn" refers to a yarn prepared from two or more yarns (or "ends"), which can be the same or different. Composite yarn can occur in a variety of forms wherein the two or more ends are in differing orientations relative to one another, so long as the final composite yarn containing the two or more ends is stably assembled (i.e. will remain intact unless forcibly separated or disassembled). The two or more ends can, for example, be parallel, wrapped one around the other(s), twisted together, or combinations of any or all of these, as well as other orientations, depending on the properties of the composite yarn desired.

Figure 3:
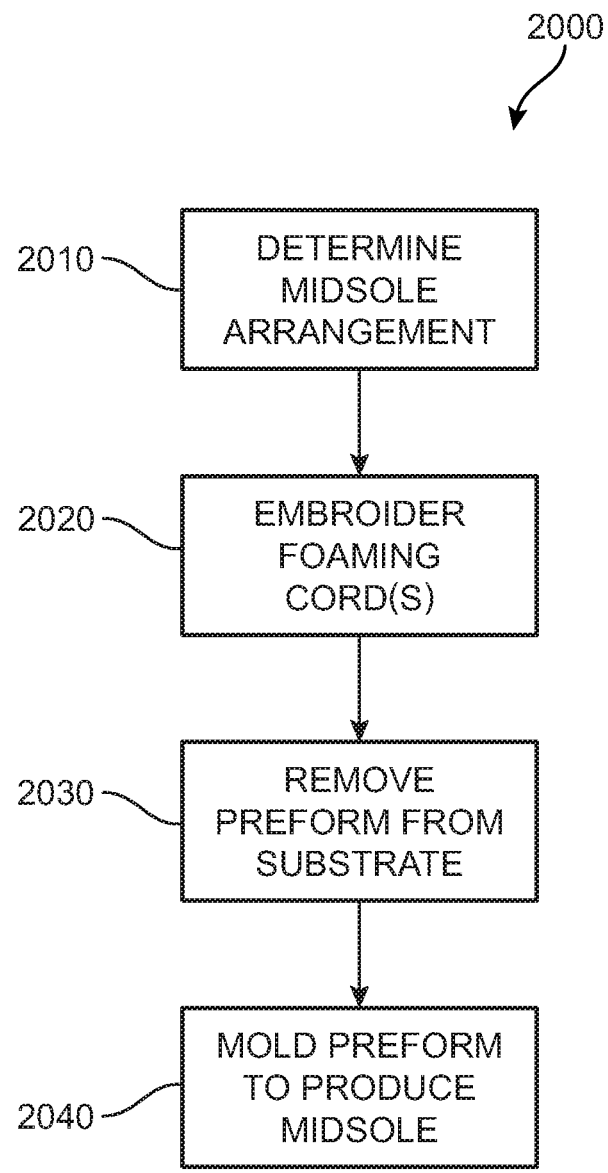
FIG. 3 is a flowchart of an exemplary process of producing a midsole using embroidered foaming cords.

In an exemplary embodiment, sole assembly 1020 of article 1000 includes midsole 1022 that can be formed using embroidered foaming cords, as will be described further below. FIG. 3 illustrates an exemplary process 2000 of forming a midsole using embroidered foaming cords. It should be understood that process 2000 can include additional or different steps in different embodiments.

In a first step 2010 of process 2000, a desired arrangement for a midsole is determined. In different embodiments, step 2010 can include one or more various inputs that may be used to determine the desired arrangement for a midsole. In some cases, data associated with a foot of a purchaser or wearer of an article of footwear can be used as one input for determining the midsole arrangement at step 2010. For example, data associated with a foot of a purchaser or wearer of an article of footwear can be obtained by a foot scanning device or other tool for measuring foot parameters. Data associated with a foot could additionally or alternatively be obtained from a saved profile or database. Additional examples of data associated with a foot that could be used include pressure maps, running style, and/or foot strike characteristics. With this arrangement, a midsole can be provided with an arrangement having customized cushioning properties.

In other cases, a variety of preset or predetermined types of midsoles with arrangements configured for particular support characteristics, sports or activities, and/or sole assembly configurations can be used as inputs for determining the midsole arrangement at step 2010. In some embodiments, midsoles having different cushioning properties can be made using different densities of foaming cords. For example, a midsole for a basketball shoe can be made using a harder foaming cord to provide a midsole with a greater degree of stability and a midsole for a running shoe can be made using a softer foaming cord to provide a greater degree of cushioning and to reduce weight. With this arrangement, multiple types of midsoles for different articles of footwear can be made using a single mold.

Once a desired midsole arrangement has been determined at step 2010, process 2000 includes a step 2020 of embroidering one or more foaming cords to a substrate material. In an exemplary embodiment, step 2020 can be performed using an embroidery machine and/or a sewing machine configured to embroider or stitch the foaming cords to the substrate material. Step 2020 can include using a thread to embroider the foaming cord to the substrate material. As used herein, a thread may be any form of strand, yarn, composite yarn, and/or filament mentioned herein including materials such as PVA, EVA or TPU. In some cases, the thread used for embroidering the foaming cord may be made of a material that melts or dissolves, such as EVA or TPU. In other cases, the thread used for embroidering the foaming cord may remain after the midsole is finished by using a thread that does not melt or dissolve.

Additionally, in other embodiments, a substrate material may not be used. In some cases, one or more layers of foaming cords may be stitched or embroidered to other foaming cords to form the midsole.

Next, at step 2030, a midsole preform formed by the embroidered foaming cords that have been arranged according to the desired midsole arrangement determined at step 2010 can be removed from the substrate material. In some cases, removing the midsole preform from the substrate material can include cutting the midsole preform from the surrounding substrate material. In other cases, removing the midsole preform form the substrate material can include dissolving the substrate material to leave the midsole preform.

Additionally, in other embodiments, embroidered foaming cords may be embroidered directly within the mold cavities, either to a substrate material disposed within the mold cavity, or directly upon one or more layers of other foaming cords.

Once the midsole preform has been removed from the substrate material at step 2030, the preform may then be placed into a mold at step 2040. At step 2040, the midsole preforms can be molded by application of pressure and/or heat to cause the foaming cords to expand within the mold cavities of the mold. In other embodiments, different materials may require different processing as part of step 2040 and/or as part of finishing the sole assembly. For example, different amounts or levels of steam, heat, compression and/or different frequencies of electromagnetic radiation, such as microwaves, ultrasound, UV light, infrared light, or other curing processes may be used to cure the midsole or other components of the sole assembly. Once the molding process has been completed at step 2040, the midsoles may be removed from the mold and can undergo optional finishing processes in preparation for attachment or joining to an upper to make the article of footwear, such as article of footwear 1000.

Figure 4:
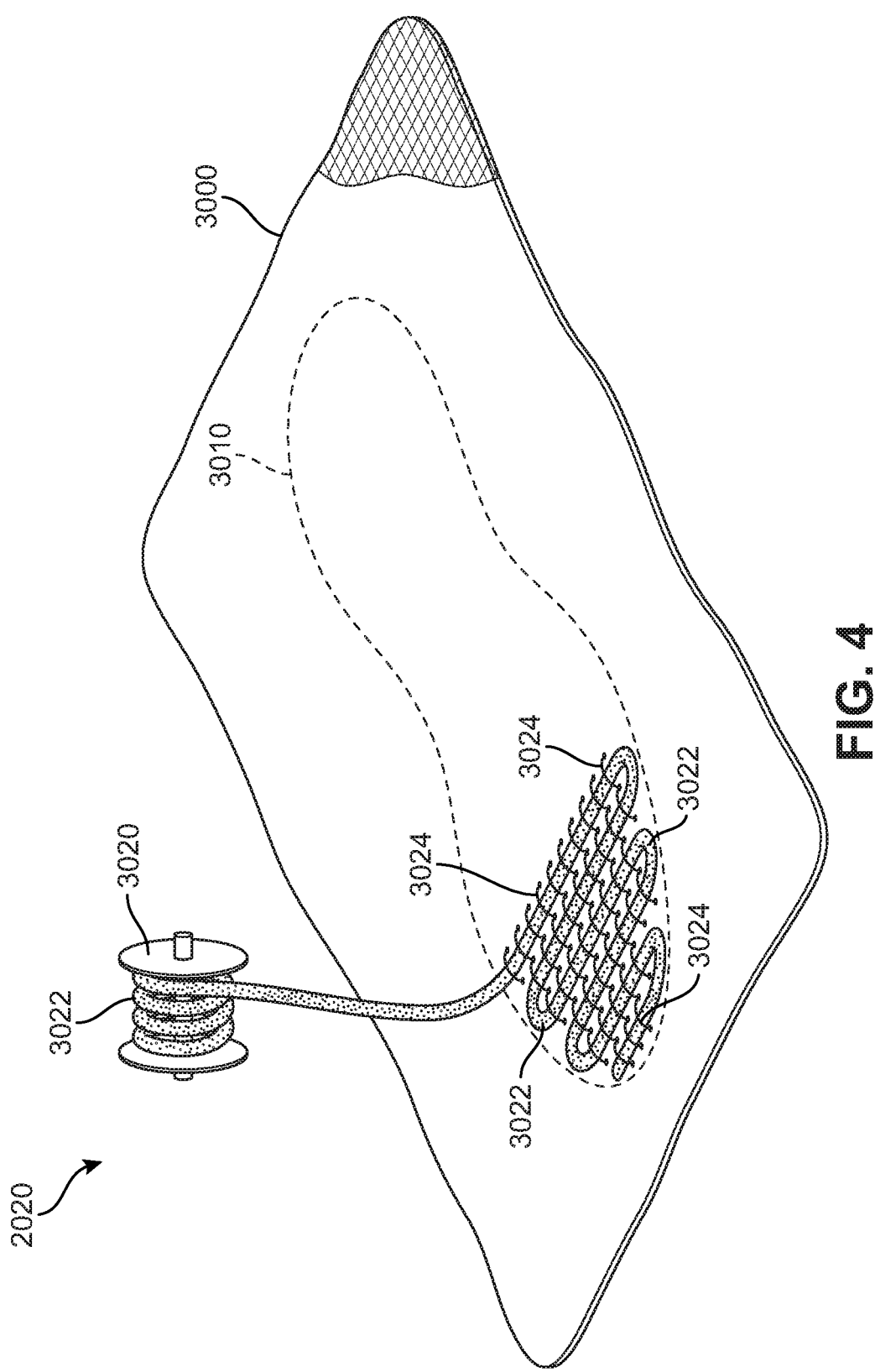
FIG. 4 is a schematic view of a step of embroidering a foaming cord to a substrate material, according to an embodiment.

FIGS. 4 through 8 illustrate one or more exemplary steps of process 2000 and are described in detail with regard to one exemplary embodiment of a midsole. Referring now to FIG. 4, a part of step 2020 of process 2000 is shown, where a thread is being used to embroider a foaming cord to a substrate material. In this embodiment, a substrate material 3000 is provided as a base layer or foundation element for embroidering the foaming cords. Substrate material 3000 may be a fabric or other suitable material that provides a base or foundation upon which foaming cords can be embroidered or stitched in place. In this embodiment, substrate material 3000 also includes an outline 3010 of the midsole preform to assist with removal of the preform from the remaining substrate material 3000 after embroidering of the foaming cords has been completed. In other embodiments, however, outline 3010 may be optional and can be omitted.

In one embodiment, foaming cords may be previously formed and are supplied by a spool 3020 that includes a quantity of foaming cord 3022. A variety of different materials may be used as foaming cords, including a single type of material or combinations of materials, including, but not limited to rubber, TPU, ETPU, EVA, PU, as well as other types of foams. The material selection for the particular foaming cord can vary in different embodiment depending on the desired properties for the midsole, including cushioning properties, abrasion resistance, compressibility and/or density. In some cases, the foaming cords may be pre-blown or partially pre-blown using an extruder to form the foaming cords. In other cases, the foaming cords can be extruded directly into the mold cavity.

In this embodiment, an embroidery machine or sewing machine (not shown) can be used to embroider a foaming cord 3022 to substrate material 3000 following outline 3010. Foaming cord 3022 is embroidered or stitched to substrate material 3000 using a thread 3024. Thread 3024 may also be supplied by a separate spool (not shown) available to the embroidery machine or sewing machine. As shown in FIG. 4, foaming cord 3022 is placed onto substrate material 3000 according to outline 3010 denoting the perimeter of the midsole shape. Once foaming cord 3022 is laid onto substrate material 3000, it can be embroidered or stitched in place using thread 3024. In an exemplary embodiment, an embroidery machine can be used to stich thread 3024 using a needle that routes thread 3024 through openings in the fabric comprising substrate material 3000. In other embodiments, the needle can pierce substrate material 3000 to create its own opening in the fabric of substrate material 3000 and stiches thread 3024 through the resulting holes.

In this embodiment, thread 3024 extends over a section of foaming cord 3022 between two openings in substrate material 3000 to attach or secure foaming cord 3022 to substrate material 3000. During the embroidering process of step 2020, an initial stitch pierces substrate material 3000 or an opening in the fabric of substrate material 3000. A portion of foaming cord 3022 is then laid onto substrate material 3000 by the embroidery machine from the continuous feed of foaming cord 3022 on spool 3020, and secured to substrate material 3000 by a second backer stitch closing a loop of thread 3024 through substrate material 3000. The technique of stitching foaming cord 3022 to substrate material 3000 using thread 3024 may vary. In some embodiments, the techniques or stiches used may include chain stitch, double chain stitch, the buttonhole or blanket stitch, the running stitch, the satin stitch, the cross stitch, or any other stitch technique known in the art. In other embodiments, a combination of known stitch techniques may be used. In further embodiments, these techniques may be used individually or in combination to stitch one or more portions of foaming cord 3022 or other foaming cords to substrate material 3000 and/or to other portions of foaming cords.

Figure 5:
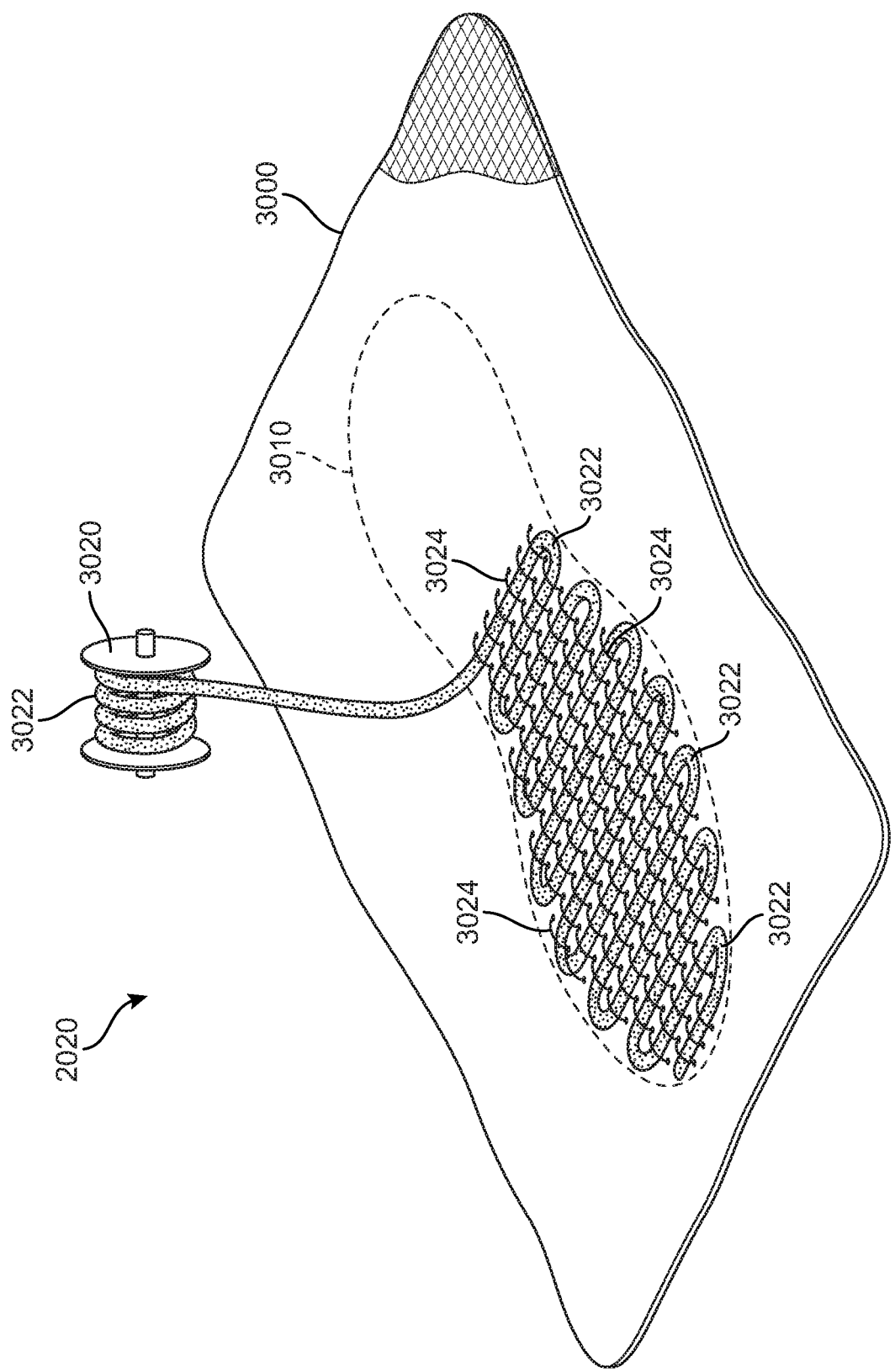
FIG. 5 is a schematic view of another step of embroidering a foaming cord to a substrate material, according to an embodiment.

FIG. 5 illustrates a further part of step 2020 of process 2000, where foaming cord 3022 has been repeatedly embroidered to substrate material 3000 using thread 3024. In this embodiment, foaming cord 3022 repeatedly extends approximately laterally across the surface of substrate material 3000 according to outline 3010 of the desired midsole shape. In some cases, foaming cord 3022 may be embroidered onto substrate material 3000 in a generally continuous manner using a single foaming cord 3022. In other cases, foaming cord 3022 can be cut or divided into multiple sections during the embroidering process of step 2020.

Figure 6:
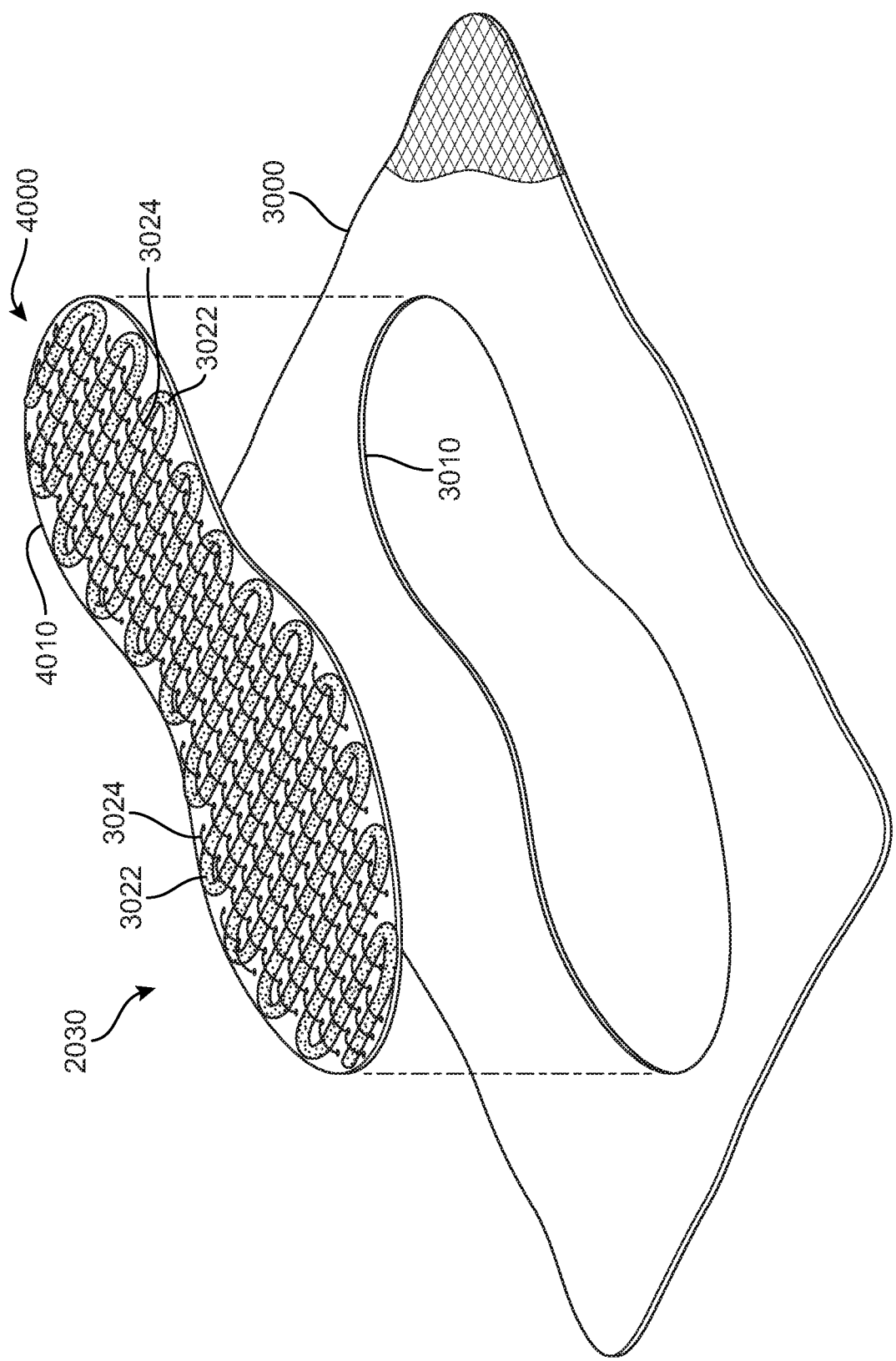
FIG. 6 is a schematic view of a step of removing an embroidered foaming cord midsole preform from a substrate material, according to an embodiment.

Once the process of embroidering foaming cord 3022 to substrate material 3000 is finished, a midsole preform 4000 may be removed from substrate material 3000. Referring now to FIG. 6, in this embodiment, step 2030 of process 2000 is shown for removing midsole preform 4000 from substrate material 3000. As shown in FIG. 6, an unfinished midsole preform 4000 may be removed from the remaining substrate material 3000 by cutting or otherwise separating the portion of substrate material 3000 having foaming cord 3022 embroidered by thread 3024 along outline 3010. Once removed, midsole preform 4000 has an outer perimeter 4010 that corresponds to outline 3010 on substrate material 3000 and defines the shape of the midsole. As described above, in other embodiments, substrate material 3000 may be made from a dissolvable fabric or material and midsole preform 4000 may be removed by dissolving substrate material 3000 to leave behind preform 4000.

Figure 7:
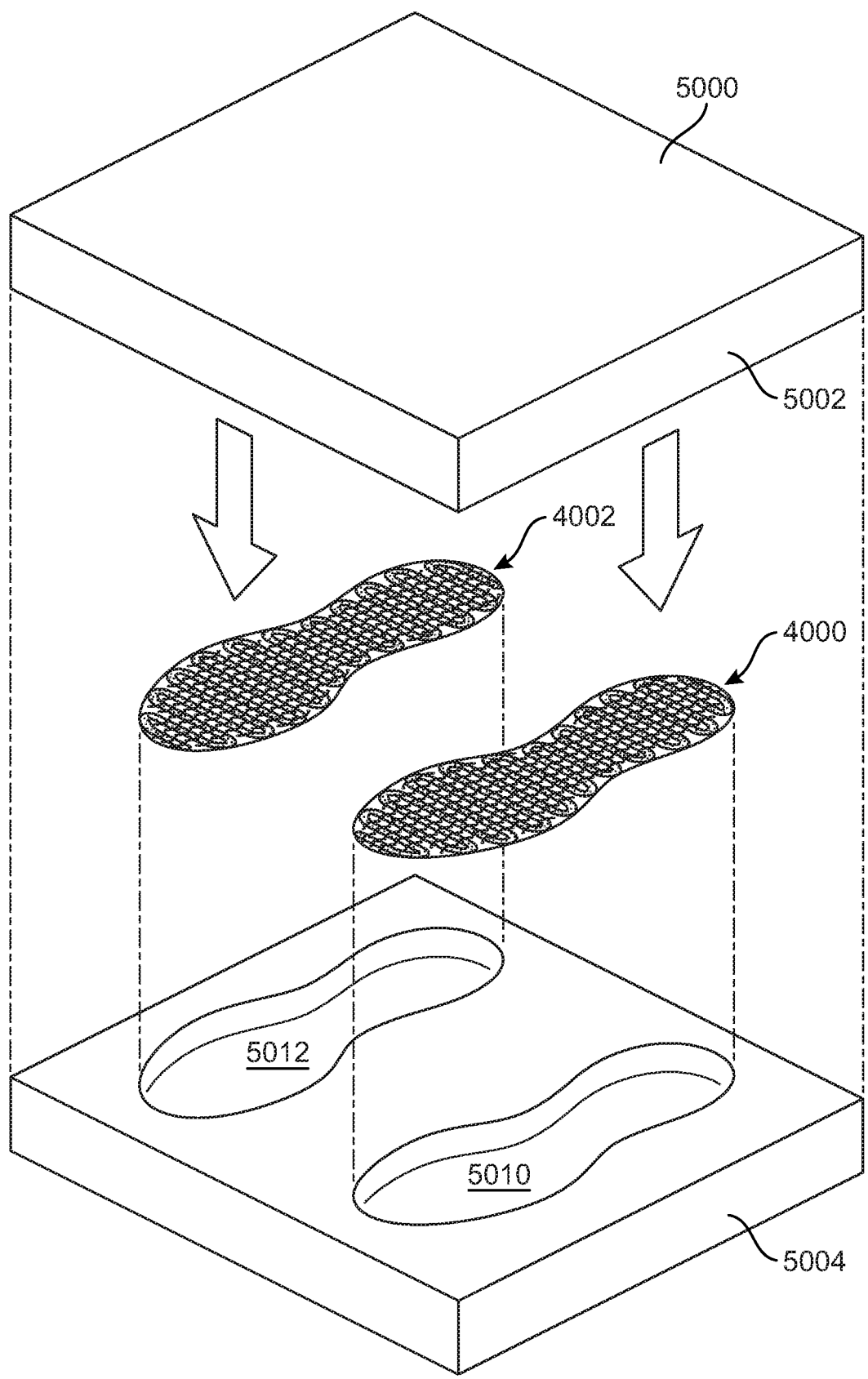
FIG. 7 is a schematic view of a step of placing a pair of embroidered foaming cord midsole preforms into a mold, according to an embodiment.

Referring now to FIG. 7, a mold 5000 is illustrated for molding the midsole preforms into midsoles. In this embodiment, mold 5000 includes a top portion 5002 and a bottom portion 5004. Bottom portion 5004 can include mold cavities, including a first mold cavity 5010 and a second mold cavity 5012, to accommodate each midsole of a pair of midsoles, one for a left foot and one for a right foot. First mold cavity 5010 and second mold cavity 5012 are recesses in bottom portion 5004 of mold 5000 that are configured to form a midsole of a given size and shape. A variety of different molds and/or mold cavities can be provided to form different sizes and/or shapes of midsoles. Additionally, mold cavities can be deeper or shallower to form midsoles with different thicknesses.

In this embodiment, midsole preform 4000 and another midsole preform 4002 may each be placed in a corresponding mold cavity in bottom portion 5004 of mold 5000. Midsole preform 4000 can be placed in first mold cavity 5010 and midsole preform 4002 can be placed in second mold cavity 5012. With this arrangement, midsole preform 4000 and midsole preform 4002 may be for each of a right foot and a left foot and are formed into midsoles together in a single mold to be used for making a single pair of footwear. In other embodiments, different numbers of mold cavities may be used in a single mold or in multiple molds to produce a plurality of midsoles for a plurality of articles of footwear.

Figure 8:
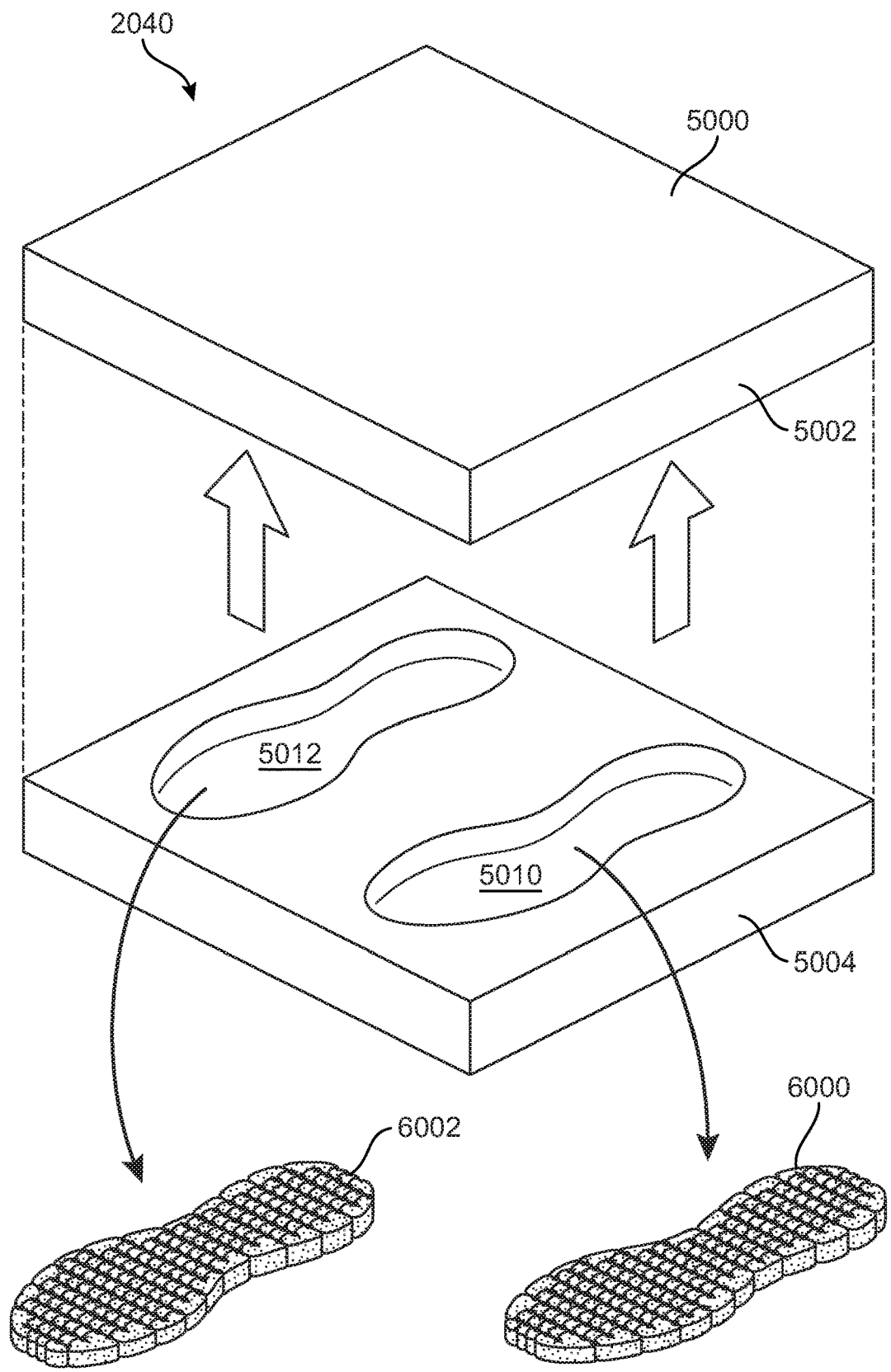
FIG. 8 is a schematic view of a step of removing a pair of molded embroidered foaming cord midsoles from a mold, according to an embodiment.

Referring now to FIG. 8, mold 5000 is shown being opened after the molding process to remove the midsoles as part of step 2040 of process 2000. In this embodiment, molding midsole preform 4000 and midsole preform 4002 can include applying heat and/or pressure to form, respectively, first midsole 6000 and second midsole 6002. During the molding process, embroidered foaming cords 3022 of the midsole preforms expand to fill and correspond to the shape of the mold cavities. In this embodiment, foaming cords 3022 of midsole preform 4000 expand to fill first mold cavity 5010 and foaming cords 3022 of midsole preform 4002 expand to fill second mold cavity 5012. The degree or amount of expansion of foaming cords 3022 may depend upon the selection of materials for foaming cords 3022 and/or the amount of heat or pressure applied within mold 5000. With this process, first midsole 6000 has the size and shape of corresponding first mold cavity 5010 and second midsole 6002 has the size and shape of corresponding second mold cavity 5012.

In some cases, other molding techniques, as described above, may optionally or additionally be applied to the midsole preforms as part of the molding process. Additionally, once first midsole 6000 and second midsole 6002 are removed from first mold cavity 5010 and second mold cavity 5012 of bottom portion 5004 of mold 5000, each of first midsole 6000 and second midsole 6002 may undergo optional finishing processes in preparation for attachment or joining to an upper to make an article of footwear, such as article of footwear 1000.

Figure 9:
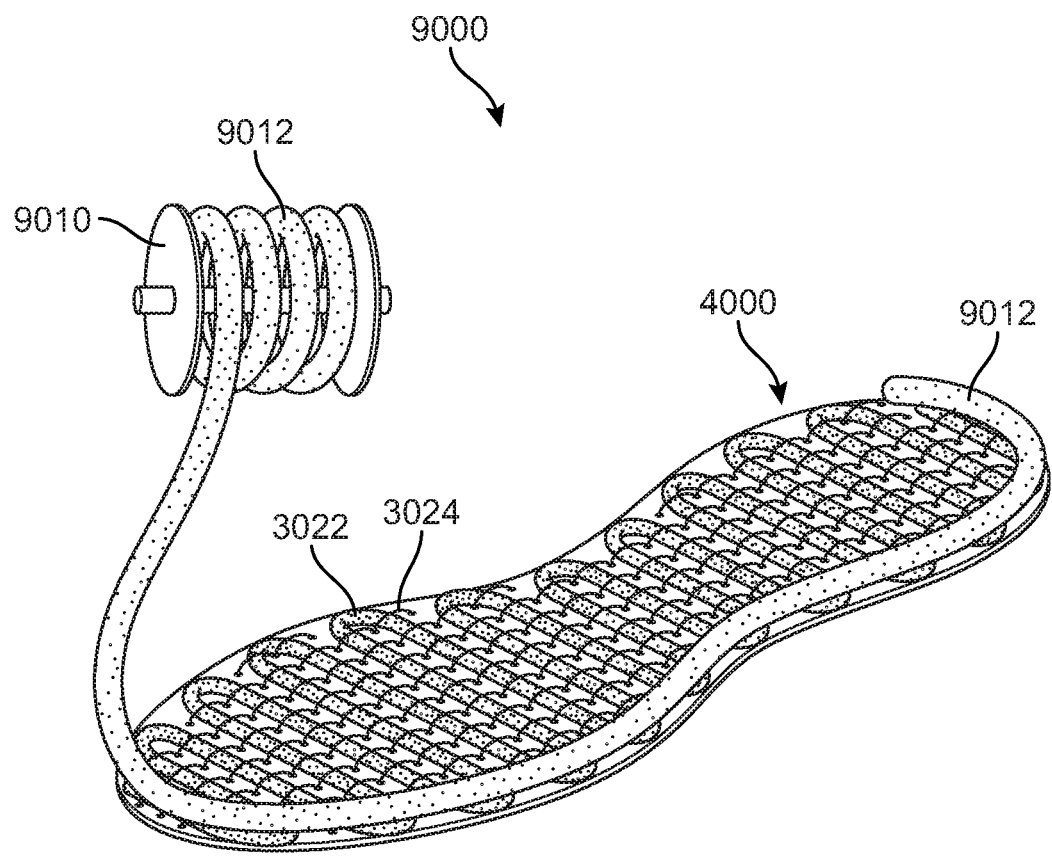
FIG. 9 is a schematic view of a step of embroidering multiple layers of foaming cords to a substrate material, according to an alternate embodiment.

In some embodiments, multiple layers of foaming cords may be arranged on top of one another to form the midsole preform. FIGS. 9 through 13 illustrate various alternate embodiments of midsole preforms formed using multiple layers of embroidered foaming cords. Referring now to FIG. 9, an alternate embodiment of a midsole 9000 made of multiple layers of embroidered foaming cords is illustrated. In one embodiment, multiple layer midsole 9000 can be formed by embroidering additional layers of foaming cords onto a previously formed midsole, for example, midsole preform 4000, described above. In this embodiment, midsole preform 4000 is initially formed by embroidering foaming cords 3022 to substrate material 3000 and an additional layer of another foaming cord, in this case, a second foaming cord 9012, is then embroidered on top of foaming cord 3022. As in previous embodiments, second foaming cord 9012 can be supplied to an embroidery machine (not shown) by a spool 9010 and is embroidered onto foaming cords 3022 of midsole preform 4000 using a thread, for example, thread 3024 or another type of thread.

In this embodiment, second foaming cord 9012 is a different type of foaming cord, for example, made of a different material, than foaming cord 3022. In some cases, second foaming cord 9012 may be configured with a lesser density or greater compressibility by using a softer foam material so that the layer of multiple layer midsole 9000 formed by second foaming cord 9012 provides cushioning to a foot of a wearer. For example, the layer of multiple layer midsole 9000 formed by second foaming cord 9012 may be configured as a sockliner or insole layer that is disposed closer to the bottom of a wearer's foot than the layer of multiple layer midsole 9000 formed by foaming cord 3022. Additionally, in this embodiment, second foaming cord 9012 may be embroidered onto midsole preform 4000 in a generally longitudinal direction extending between a heel and toe of the midsole. In other embodiments, second foaming cord 9012 may be embroidered onto midsole preform 4000 in any direction and/or orientation, including multiple different directions and/or orientations.

Figure 10:
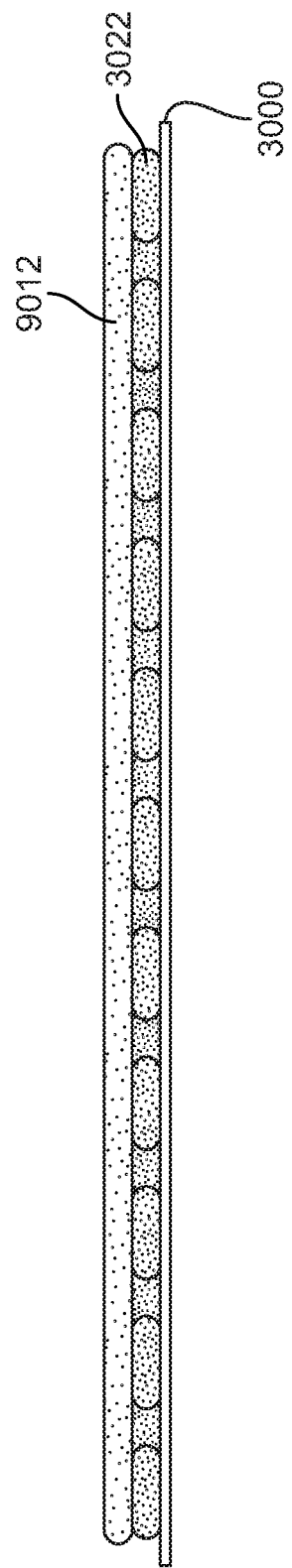
FIG. 10 is a side view of an alternate embodiment of a multiple layer embroidered foaming cord midsole.

FIG. 10 illustrates a side view of multiple layer midsole 9000 showing the arrangement of a top layer formed by second foaming cord 9012 disposed above the layer formed by foaming cord 3022. In this embodiment, substrate material 3000 of midsole preform 4000 may remain during the embroidery process of applying the layer of second foaming cord 9012. In some cases, a thread, for example, thread 3024, may extend down to the layer of substrate material 3000 beneath foaming cord 3022 to attach second foaming cord 9012 to midsole preform 4000. In other cases, a thread, for example, thread 3024, may extend only into foaming cord 3022 to attach second foaming cord 9012 to midsole preform 4000. Once the preform has been embroidered with foaming cords to form multiple layer midsole 9000, it may then be molded as described above with regard to process 2000 and FIG. 3. As described in previous embodiments, substrate material 3000 may later be dissolved from midsole 9000 or may become part of the finished midsole after the molding process is complete.

Figure 11:
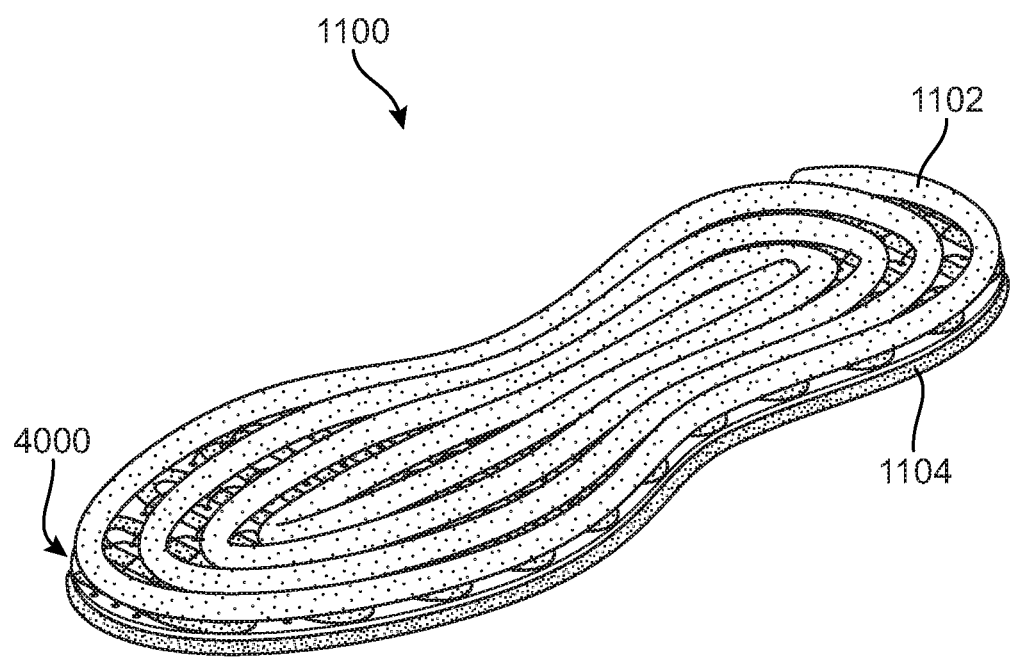
FIG. 11 is a schematic isometric view of another alternate embodiment of a multiple layer embroidered foaming cord midsole.

Referring now to FIG. 11, another alternate embodiment of a midsole 1100 made of multiple layers of embroidered foaming cords is illustrated. In one embodiment, multiple layer midsole 1100 can be formed by embroidering at least two additional layers of foaming cords onto a previously formed midsole, for example, midsole preform 4000, described above. In this embodiment, a second foaming cord 1102 is embroidered onto midsole preform 4000 on top of the layer of foaming cord 3022. As described above with regard to the embodiment of FIGS. 9 and 10, second foaming cord 1102 can be configured with a lesser density or greater compressibility by using a softer foam material so that the layer of multiple layer midsole 1100 formed by second foaming cord 1102 provides cushioning to a foot of a wearer. For example, the layer of multiple layer midsole 1100 formed by second foaming cord 1102 may be configured as a sockliner or insole layer that is disposed closer to the bottom of a wearer's foot than the layer of multiple layer midsole 1100 formed by foaming cord 3022.

Additionally, in this embodiment, a third foaming cord 1104 is also embroidered onto midsole preform 4000 beneath the layer of foaming cord 3022. In some embodiments, third foaming cord 1104 can be configured with a greater density or lesser compressibility by using a harder foam material so that the layer of multiple layer midsole 1100 formed by third foaming cord 1104 provides support to a foot of a wearer. Third foaming cord 1104 may also be made of an abrasion or wear-resistant durable material so that the layer of multiple layer midsole 1100 formed by third foaming cord 1104 can act as an outsole layer of an article of footwear configured to interact with a ground surface.

In this embodiment, the layer of third foaming cord 1104 is shown embroidered to substrate material 3000 disposed on the opposite side from foaming cord 3022 and second foaming cord 1102. In other embodiments, layers of multiple layer midsole 1100 may be embroidered in a different order. For example, in one embodiment where one or more layers of foaming cords are embroidered directly within corresponding mold cavities, for example, first mold cavity 5010 and second mold cavity 5012, described above, each layer of multiple layer midsole 1100 may be embroidered in order, starting from the bottom-most layer and applying each additional layer onto the previous layer. Accordingly, in such an embodiment, third foaming cord 1104 can be embroidered first to form the bottom layer of multiple layer midsole 1100 that can serve as an outsole. Next, foaming cord 3022 can be embroidered onto third foaming cord 1104 and second foaming cord 1102 can be embroidered onto foaming cord 3022 to form the innermost layer that can serve as an insole or sockliner layer. Once the preform has been embroidered with foaming cords to form multiple layer midsole 1100, it may then be molded as described above with regard to process 2000 and FIG. 3.

In this embodiment, multiple layer midsole 1100 includes three layers of foaming cords, each of which uses a foaming cord made of a different material. In other embodiments, a multiple layer midsole may be formed by embroidering any number of foaming cords into any number of layers. For example, in some cases, a multiple layer midsole may be formed from three to five layers of embroidered foaming cords. In other cases, the midsole may include a larger or smaller number of layers of embroidered foaming cords. In addition, the layers of a multiple layer midsole may be formed using one or more different types or materials of foaming cords. For example, in some cases, each layer may be made from a different type or material of foaming cord to impart different desired properties and/or characteristics to the midsole. In other cases, layers may include similar or the same type or material of foaming cord. In still other cases, each layer can include two or more sections of different types or materials of foaming cords. Accordingly, a customized midsole with desired properties and/or characteristics can be made by embroidering different foaming cords at different locations and/or layers of the midsole.

Figure 12:
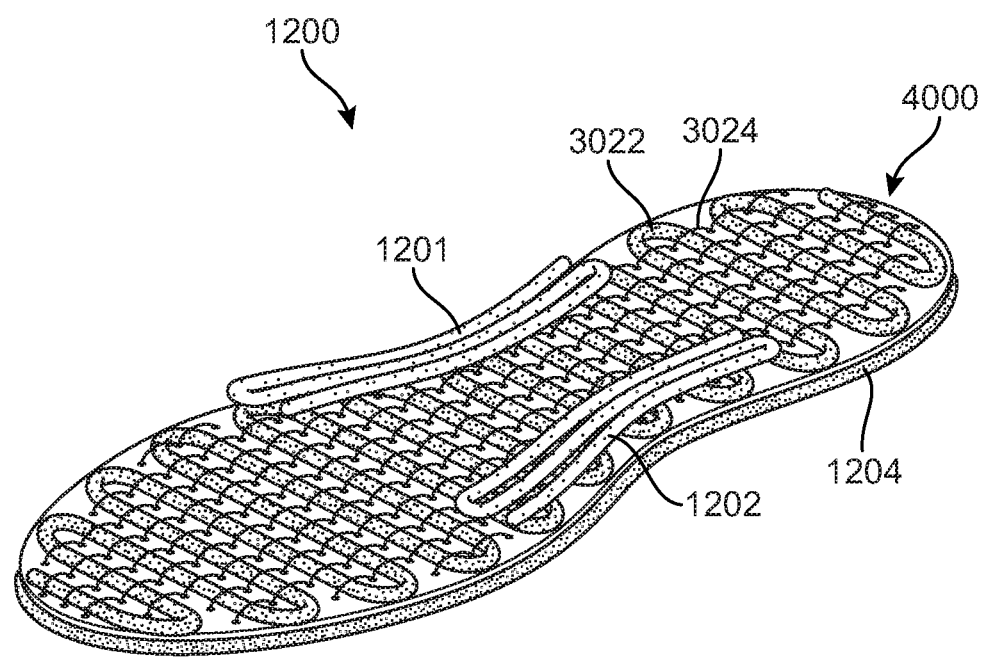
FIG. 12 is a schematic isometric view of another alternate embodiment of a multiple layer embroidered foaming cord midsole with lateral and medial support.
Figure 13:
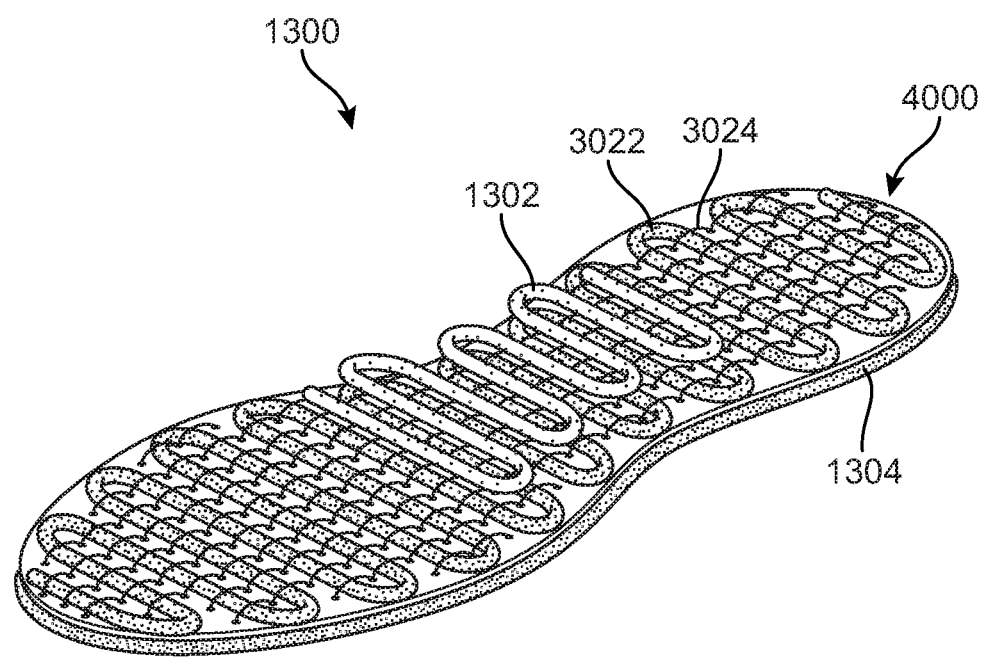
FIG. 13 is a schematic isometric view of another alternate embodiment of a multiple layer embroidered foaming cord midsole with arch support.

In some embodiments, additional layers of foaming cords may be embroidered in selected locations on the midsole to provide areas of additional support and/or cushioning to a foot of a wearer. FIGS. 12 and 13 illustrate alternate embodiments of midsoles having additional layers foaming cords embroidered at selected locations to provide support. Referring now to FIG. 12, a midsole 1200 is provided with additional layers of foaming cords on each of a medial and lateral side of the midsole preform to provide a foot of a wearer with lateral and medial stability. In one embodiment, additional layers of foaming cords can be embroidered onto a previously formed midsole preform, for example, midsole preform 4000, described above, at select locations.

In this embodiment, a medial foaming cord 1201 is embroidered on top of foaming cord 3022 at a location corresponding to a midfoot region of the medial side of midsole preform 4000. Similarly, a lateral foaming cord 1202 is embroidered on top of foaming cord 3022 at a location corresponding to a midfoot region of the lateral side of midsole preform 4000. As with previous embodiments, medial foaming cord 1201 and/or lateral foaming cord 1202 can be embroidered using an embroidery machine (not shown) and using a thread, for example, thread 3024. Additionally, each of medial foaming cord 1201 and/or lateral foaming cord 1202 may be embroidered in one or more layers to provide a desired thickness of material at these locations. With this arrangement, midsole 1200 can be configured to provide side support for a foot of a wearer with medial and lateral bolsters. For example, midsole 1200 may be used with an article of footwear that is configured for playing a sport or activity with cutting motions, i.e., lateral movements, that would be assisted by additional side support for a foot of a wearer.

Additionally, midsole 1200 may also include another layer of foaming cords embroidered beneath midsole preform 4000, as described in previous embodiments. In this embodiment, an outsole foaming cord 1204 is disposed beneath foaming cord 3022 and is configured to form a layer of midsole 1200 that can be in contact with a ground surface when attached to an article of footwear. Once the preform has been embroidered with foaming cords to form midsole 1200, it may then be molded as described above with regard to process 2000 and FIG. 3.

Referring now to FIG. 13, another alternate embodiment of a midsole 1300 is provided with additional layers of foaming cords in the midfoot region of the midsole preform to provide a foot of a wearer with arch support. In one embodiment, additional layers of foaming cords can be embroidered onto a previously formed midsole preform, for example, midsole preform 4000, described above, at select locations.

In this embodiment, a midfoot foaming cord 1302 is embroidered on top of foaming cord 3022 at a location corresponding to a midfoot region of midsole preform 4000. As with previous embodiments, midfoot foaming cord 1302 can be embroidered using an embroidery machine (not shown) and using a thread, for example, thread 3024. Additionally, midfoot foaming cord 1302 may be embroidered in one or more layers to provide a desired thickness of material at this location. With this arrangement, midsole 1300 can be configured to provide arch support for a foot of a wearer. For example, midsole 1300 may be used with an article of footwear that is configured for a wearer with a high arch or for a sport, such as running, that would be assisted by additional arch support for a foot of a wearer.

Additionally, midsole 1300 may also include another layer of foaming cords embroidered beneath midsole preform 4000, as described in previous embodiments. In this embodiment, an outsole foaming cord 1304 is disposed beneath foaming cord 3022 and is configured to form a layer of midsole 1300 that can be in contact with a ground surface when attached to an article of footwear. Once the preform has been embroidered with foaming cords to form midsole 1300, it may then be molded as described above with regard to process 2000 and FIG. 3.

Figure 14:
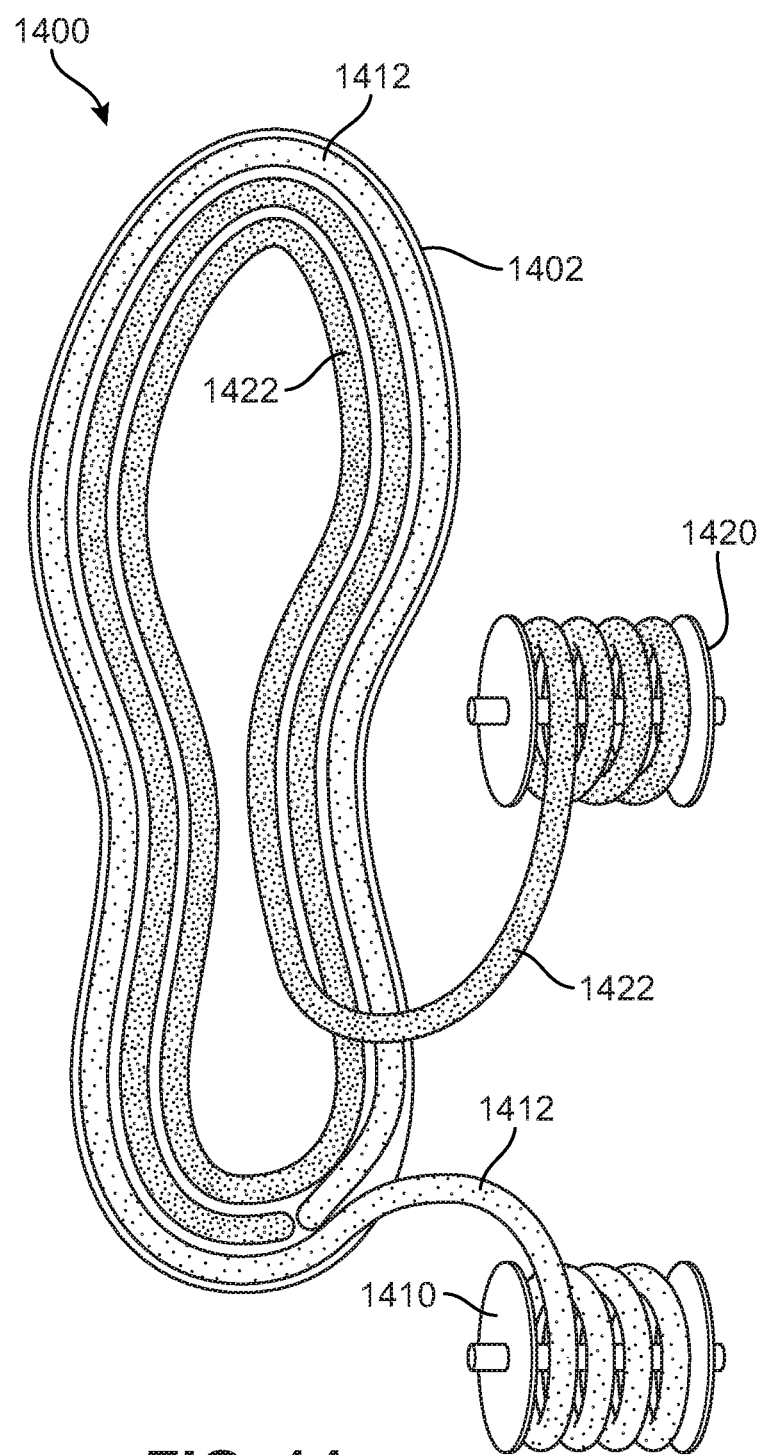
FIG. 14 is a schematic view of a step of embroidering multiple types of foaming cords to a substrate material, according to an alternate embodiment.

In some embodiments, two or more foaming cords having different material properties may be embroidered in different locations to provide a midsole having selected properties and/or characteristics in different regions or portions of the midsole. For example, as part of step 2010 of process 2000, described above, a midsole may be arranged to have a first density or compressibility in one portion of the midsole and a second density or compressibility in another portion of the midsole. FIG. 14 illustrates an alternate embodiment of a midsole preform 1400 that is formed by embroidering two different foaming cords made of different materials at different locations on midsole preform 1400. In this embodiment, a first foaming cord 1412 made of a first material may be supplied to an embroidery machine (not shown) from a first spool 1410. A second foaming cord 1422 made of a second material that is different from the first material may be supplied to the embroidery machine from a second spool 1420.

In this embodiment, each of first foaming cord 1412 and second foaming cord 1422 is selectively embroidered onto different locations of a substrate material 1402, for example, a fabric or substantially similar material as substrate material 3000, described above. As shown in FIG. 14, first foaming cord 1412 may be embroidered on substrate material 1402 so as to form an outer perimeter extending around midsole preform 1400. Second foaming cord 1422 may be embroidered on substrate material 1402 in the interior of the outer perimeter formed by first foaming cord 1412. In one embodiment, the first material of first foaming cord 1412 may be a hard foam material that provides structural support and stability to the outer perimeter of midsole 1400. Second material of second foaming cord 1422 may be a soft foam material that provides cushioning and shock absorption to the inner portion of midsole 1400. With this arrangement, first material of first foaming cord 1412 may be of greater density or lesser compressibility than second material of second foaming cord 1422 so that the inner portion of midsole 1400 that will underlie the foot of a wearer provides cushioning and the outer perimeter of midsole 1400 provides stability to the article of footwear. Once the preform has been embroidered with foaming cords to form midsole 1400, it may then be molded as described above with regard to process 2000 and FIG. 3.

Figure 15:
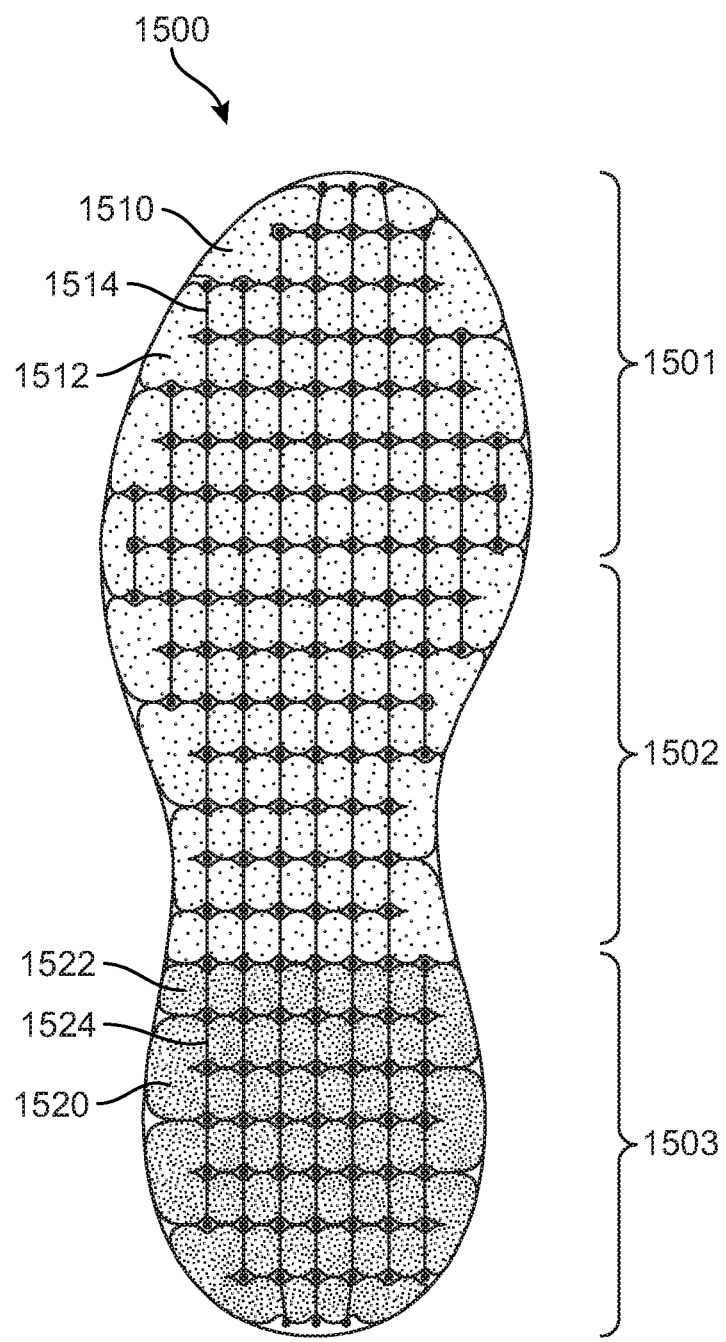
FIG. 15 is a schematic view of an alternate embodiment of an embroidered foaming cord midsole with different material properties.
Figure 16:
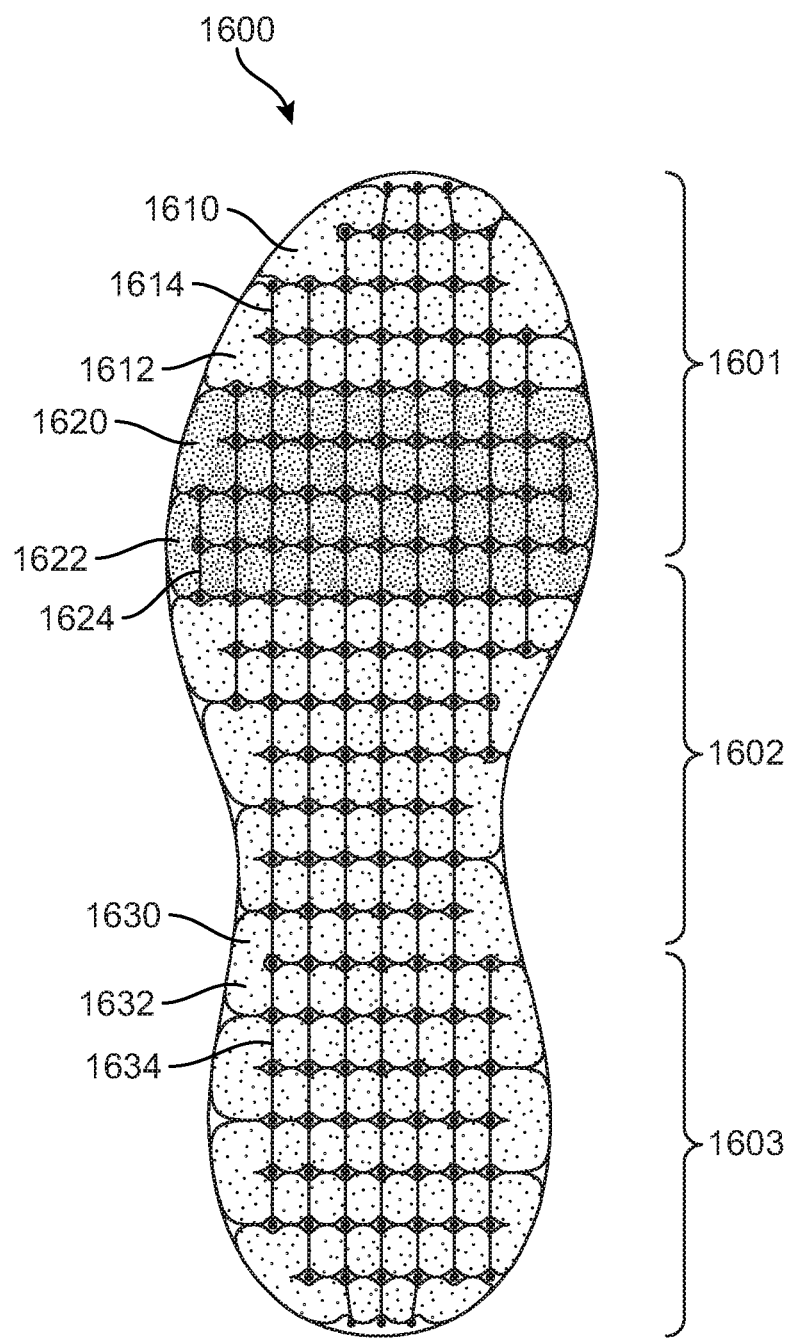
FIG. 16 is a schematic view of another alternate embodiment of an embroidered foaming cord midsole with different material properties.

In other embodiments, different foaming cords formed of different materials may be used in other locations to provide a customized midsole with varying levels of compressibility and/or support. For example, FIGS. 15 and 16 illustrate two alternate embodiments of midsoles for articles of footwear that have been customized based on data associated with a foot of a wearer. Referring now to FIG. 15, a heel-striking midsole 1500 is illustrated. In this embodiment, midsole 1500 may be generally divided into three regions: a forefoot region 1501, a midfoot region 1502, and a heel region 1503. Based on data associated with a foot, a customized midsole arrangement may be provided, for example, as part of step 2010 of process 2000, described above, that is configured to provide extra support and cushioning to heel region 1503 of midsole 1500.

Accordingly, a first region 1510 of midsole 1500 corresponding to forefoot region 1501 and midfoot region 1502 may be formed by embroidering a first foaming cord 1512 with thread 1514. First foaming cord 1512 can be made of a material that has a first density or compressibility. A second region 1520 of midsole 1500 corresponding to heel region 1503 may be formed by embroidering a second foaming cord 1522 with thread 1524. Second foaming cord 1522 can be made of a material that has a second density or compressibility. In this embodiment, the second density of second foaming cord 1522 is greater than first density of first foaming cord 1512 so that second region 1520 of midsole 1500 is harder or less compressible than first region 1510 of midsole 1500. With this arrangement, midsole 1500 may provide a customized midsole arrangement with greater support and cushioning in heel region 1503 based on data that indicates that the wearer has a "heel-striking" stride.

Referring now to FIG. 16, a ball-striking midsole 1600 is illustrated. In this embodiment, midsole 1600 may be generally divided into three regions: a forefoot region 1601, a midfoot region 1602, and a heel region 1603. Based on data associated with a foot, a customized midsole arrangement may be provided, for example, as part of step 2010 of process 2000, described above, that is configured to provide extra support and cushioning to portions of forefoot region 1601 and/or midfoot region 1602 of midsole 1600.

Accordingly, a first region 1610 of midsole 1600 corresponding to a front portion of forefoot region 1601 may be formed by embroidering a first foaming cord 1612 with thread 1614. First foaming cord 1612 can be made of a material that has a first density or compressibility. A second region 1620 of midsole 1600 corresponding to a portion of forefoot region 1601 and/or midfoot region 1602 that is configured to lie underneath the ball of a foot of a wearer may be formed by embroidering a second foaming cord 1622 with thread 1624. Second foaming cord 1622 can be made of a material that has a second density or compressibility. In this embodiment, the second density of second foaming cord 1622 is greater than first density of first foaming cord 1612 so that second region 1620 of midsole 1600 is harder or less compressible than first region 1610 of midsole 1600. The remaining third region 1630 of midsole 1600 corresponding to a portion of midsole region 1602 and heel region 1603 may be formed by embroidering a third foaming cord 1632 with thread 1634. In some cases, third foaming cord 1632 may be made of the same material as first foaming cord 1612. In other cases, third foaming cord 1632 may be made of a different material that has a third density or compressibility that is different than either or both of the first density of first foaming cord 1612 and the second density of second foaming cord 1622. With this arrangement, midsole 1600 may provide a customized midsole arrangement with greater support and cushioning in forefoot region 1601 and/or midfoot region 1602 based on data that indicates that the wearer has a "ball-striking" stride.

It should be understood that a variety of different customized midsoles having different material properties at selected locations can be provided according to the principles of the embodiments and methods described herein.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. An article of footwear comprising:
    an upper; and
    a sole assembly;
    wherein the sole assembly includes a midsole comprising at least a first foaming cord made of a first material, a second foaming cord made of a second material, the first material being different than the second material, and a substrate material;
    wherein the first foaming cord and the second foaming cord are embroidered into a shape of the midsole onto the substrate material;
    wherein the first foaming cord repeatedly extends between a lateral side and a medial side of the substrate material in a generally continuous manner such that the first foaming cord repeatedly turns at the lateral side and the medial side and extends back in an opposite direction;
    wherein the second foaming cord is embroidered on top of the first foaming cord in a generally longitudinal direction repeatedly extending between a heel and a toe of the midsole; and
    wherein the second foaming cord is embroidered on top of the first foaming cord by a thread that extends from the second foaming cord into the first foaming cord to form an insole of the sole assembly.

2. The article of footwear according to claim 1, wherein the first material and the second material have different densities or compressibilities.

3. The article of footwear according to claim 1, wherein the first material is harder than the second material.

4. The article of footwear according to claim 1, wherein the first foaming cord is embroidered in a different layer of the midsole than the second foaming cord.

5. The article of footwear according to claim 1, wherein the first foaming cord and the second foaming cord are embroidered to the substrate material by thread following an outline on the substrate material in a shape of the midsole.

6. The article of footwear according to claim 1, wherein the sole assembly further comprises an outsole.

7. The article of footwear according to claim 6,
    wherein a third foaming cord is embroidered beneath the first foaming cord to form the outsole.

8. A midsole for an article of footwear, the midsole comprising:
    a first foaming cord, the first foaming cord made of a first material;
    a second foaming cord, the second foaming cord made of a second material different from the first material;
    a substrate material;
    wherein the first foaming cord and the second foaming cord are embroidered to the substrate material by thread that extends over portions of the first foaming cord or the second foaming cord and secures the first foaming cord or the second foaming cord to the substrate material using a backer stitch;
    wherein the first foaming cord repeatedly extends approximately laterally across a surface of the substrate material in a generally continuous manner such that the first foaming cord repeatedly turns at the lateral side and the medial side and extends back in an opposite direction;
    wherein the second foaming cord is embroidered on top of the first foaming cord in a generally longitudinal direction repeatedly extending between a heel and a toe of the midsole; and
    wherein the second foaming cord is embroidered on top of the first foaming cord by a thread that extends from the second foaming cord into the first foaming cord.

9. The midsole for an article of footwear according to claim 8, wherein the second material forming the second foaming cord has a lesser density than the first material forming the first foaming cord.

10. The midsole for an article of footwear according to claim 8, wherein the substrate material is dissolvable.

11. The midsole for an article of footwear according to claim 8, wherein the midsole comprises at least three layers of the first foaming cord and/or the second foaming cord.

12. An article of footwear comprising:
    an upper; and
    a sole assembly;
    wherein the sole assembly includes a midsole comprising at least a first foaming cord made of a first material and a second foaming cord made of a second material, the first material being different than the second material;
    wherein the first foaming cord and the second foaming cord are embroidered into a shape of the midsole in an initial configuration;
    wherein the first foaming cord repeatedly extends in a lateral direction extending between a lateral side and a medial side in a generally continuous manner such that the first foaming cord repeatedly turns at the lateral side and the medial side and extends back in an opposite direction;
    wherein the second foaming cord is embroidered on top of the first foaming cord in a generally longitudinal direction repeatedly extending between a heel and a toe of the midsole; and
    wherein the first foaming cord and the second foaming cord are configured to expand from the initial configuration to an expanded configuration to form the midsole in the presence of heat and/or pressure.

13. The article of footwear according to claim 12, wherein the first foaming cord and the second foaming cord are embroidered in the shape of the midsole onto a substrate material.

14. The article of footwear according to claim 12, wherein the first foaming cord and the second foaming cord are embroidered to a substrate material by thread that extends over portions of the first foaming cord or the second foaming cord and secures the first foaming cord or the second foaming cord to the substrate material using a backer stitch.

15. The article of footwear according to claim 12, wherein the lateral side and the medial side are inside a mold cavity.

16. The article of footwear according to claim 1, wherein the first foaming cord and the second foaming cord are embroidered onto the substrate material in an initial configuration; and wherein the first foaming cord and the second foaming cord are configured to expand from the initial configuration to an expanded configuration to form the midsole in the presence of heat and/or pressure.

17. The midsole for an article of footwear according to claim 8, wherein the first foaming cord and the second foaming cord are embroidered to the substrate material in an initial configuration; and wherein the first foaming cord and the second foaming cord are configured to expand from the initial configuration to an expanded configuration to form the midsole in the presence of heat and/or pressure.

\* \* \* \* \*